(12) United States Patent
Hakura et al.

(10) Patent No.: US 7,450,120 B1
(45) Date of Patent: Nov. 11, 2008

(54) APPARATUS, SYSTEM, AND METHOD FOR Z-CULLING

(75) Inventors: Ziyad S. Hakura, Mountain View, CA (US); Michael Brian Cox, Menlo Park, CA (US); Brian K. Langendorf, Benicia, CA (US); Brad W. Simeral, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 391 days.

(21) Appl. No.: 10/741,115

(22) Filed: Dec. 19, 2003

(51) Int. Cl.
*G06T 15/40* (2006.01)
*G06F 15/16* (2006.01)
*G06T 1/20* (2006.01)

(52) U.S. Cl. .................. 345/421; 345/422; 345/503; 345/506

(58) Field of Classification Search ............. 345/421, 345/422, 503, 506, 539, 519
See application file for complete search history.

(56) References Cited

U.S. PATENT DOCUMENTS

| | | | | |
|---|---|---|---|---|
| 5,303,334 A * | 4/1994 | Snyder et al. | .......... | 358/1.9 |
| 5,357,604 A * | 10/1994 | San et al. | .......... | 463/31 |
| 5,509,110 A * | 4/1996 | Latham | .......... | 345/422 |
| 5,574,835 A * | 11/1996 | Duluk, Jr. et al. | .......... | 345/421 |
| 5,579,455 A | 11/1996 | Greene et al. | | |
| 5,600,763 A * | 2/1997 | Greene et al. | .......... | 345/420 |
| 5,694,143 A * | 12/1997 | Fielder et al. | .......... | 345/519 |
| 5,712,664 A * | 1/1998 | Reddy | .......... | 345/519 |
| 5,727,231 A * | 3/1998 | Bartley et al. | .......... | 710/38 |
| 5,751,291 A * | 5/1998 | Olsen et al. | .......... | 345/422 |
| 5,864,342 A * | 1/1999 | Kajiya et al. | .......... | 345/418 |
| 5,867,166 A * | 2/1999 | Myhrvold et al. | .......... | 345/419 |
| 5,870,097 A * | 2/1999 | Snyder et al. | .......... | 345/426 |
| 5,880,737 A * | 3/1999 | Griffin et al. | .......... | 345/582 |
| 5,898,437 A | 4/1999 | Deolaliker | | |
| 5,977,977 A * | 11/1999 | Kajiya et al. | .......... | 345/418 |
| 5,999,187 A * | 12/1999 | Dehmlow et al. | .......... | 345/420 |
| 5,999,189 A * | 12/1999 | Kajiya et al. | .......... | 382/232 |
| 6,008,820 A * | 12/1999 | Chauvin et al. | .......... | 345/502 |
| 6,046,746 A * | 4/2000 | Deering | .......... | 345/422 |
| 6,097,400 A | 8/2000 | Dilliplane et al. | | |
| 6,184,908 B1 | 2/2001 | Chan et al. | | |
| 6,246,415 B1 * | 6/2001 | Grossman et al. | .......... | 345/422 |
| 6,247,113 B1 | 6/2001 | Jaggar | | |
| 6,252,608 B1 * | 6/2001 | Snyder et al. | .......... | 345/473 |

(Continued)

FOREIGN PATENT DOCUMENTS

CA 2298337 A1 * 8/2001

OTHER PUBLICATIONS

Greene, Ned Greene Consulting (ned@nedgreene.com), "Occlusion Culling with Optimized Hierarchical Buffering", Dec. 2000, (1 page).*

(Continued)

*Primary Examiner*—Ulka Chauhan
*Assistant Examiner*—Roberta Prendergast
(74) *Attorney, Agent, or Firm*—Cooley Godward Kronish LLP

(57) ABSTRACT

A processor generates Z-cull information for tiles and groups of tiles. In one embodiment the processor includes an on-chip cache to coalesce Z information for tiles to identify occluded tiles. In a coprocessor embodiment, the processor provides Z-culling information to a graphics processor.

15 Claims, 8 Drawing Sheets

U.S. PATENT DOCUMENTS

| | | | |
|---|---|---|---|
| 6,288,722 B1* | 9/2001 | Narayanaswami | 345/619 |
| 6,292,194 B1* | 9/2001 | Powell, III | 345/582 |
| 6,317,135 B1* | 11/2001 | Reddy | 345/519 |
| 6,323,860 B1 | 11/2001 | Zhu et al. | |
| 6,348,919 B1* | 2/2002 | Murphy | 345/421 |
| 6,359,623 B1* | 3/2002 | Larson | 345/501 |
| 6,380,935 B1* | 4/2002 | Heeschen et al. | 345/423 |
| 6,392,655 B1* | 5/2002 | Migdal et al. | 345/582 |
| 6,407,736 B1* | 6/2002 | Regan | 345/422 |
| 6,407,741 B1* | 6/2002 | Morein et al. | 345/555 |
| 6,421,058 B2* | 7/2002 | Parikh et al. | 345/522 |
| 6,421,764 B2* | 7/2002 | Morein | 711/144 |
| 6,437,780 B1* | 8/2002 | Baltaretu et al. | 345/423 |
| 6,456,285 B2* | 9/2002 | Hayhurst | 345/422 |
| 6,476,807 B1* | 11/2002 | Duluk et al. | 345/421 |
| 6,476,808 B1 | 11/2002 | Kuo et al. | |
| 6,480,205 B1* | 11/2002 | Greene et al. | 345/631 |
| 6,492,991 B1* | 12/2002 | Morein et al. | 345/555 |
| 6,525,726 B1* | 2/2003 | Xie et al. | 345/421 |
| 6,597,363 B1* | 7/2003 | Duluk et al. | 345/506 |
| 6,611,264 B1* | 8/2003 | Regan | 345/422 |
| 6,618,048 B1* | 9/2003 | Leather | 345/422 |
| 6,636,215 B1* | 10/2003 | Greene | 345/422 |
| 6,646,639 B1 | 11/2003 | Greene et al. | |
| 6,650,325 B1* | 11/2003 | Voorhies et al. | 345/426 |
| 6,664,958 B1* | 12/2003 | Leather et al. | 345/422 |
| 6,664,959 B2* | 12/2003 | Duluk et al. | 345/422 |
| 6,664,962 B1* | 12/2003 | Komsthoeft et al. | 345/426 |
| 6,697,063 B1* | 2/2004 | Zhu | 345/421 |
| 6,727,899 B2* | 4/2004 | Hoffman et al. | 345/421 |
| 6,727,900 B1* | 4/2004 | Nakamura | 345/422 |
| 6,828,983 B1* | 12/2004 | Vijayakumar et al. | 345/613 |
| 6,862,025 B2* | 3/2005 | Buehler | 345/424 |
| 6,900,810 B1* | 5/2005 | Moreton et al. | 345/522 |
| 6,903,739 B2* | 6/2005 | Morein | 345/422 |
| 6,999,076 B2* | 2/2006 | Morein | 345/422 |
| 7,053,901 B2* | 5/2006 | Huang et al. | 345/503 |
| 7,068,272 B1* | 6/2006 | Voorhies et al. | 345/422 |
| 2003/0122820 A1 | 7/2003 | Doyle | |
| 2007/0296725 A1* | 12/2007 | Steiner et al. | 345/505 |
| 2007/0296726 A1* | 12/2007 | Legakis et al. | 345/506 |

OTHER PUBLICATIONS

Greene, et al., "Hierarchical Z-buffer visibility", Proceedings of the 20th Annual Conference on Computer Graphics and interactive Techniques, SIGGRAPH '93, ACM Press, New York, NY, pp. 231-238.*

Greene, N., "Hierarchical polygon tiling with coverage masks", Proceedings of the 23rd Annual Conference on Computer Graphics and Interactive Techniques, SIGGRAPH '96, ACM Press, New York, NY, pp. 65-76.*

Xie, et al., "Adaptive hierarchical visibility in a tiled architecture", Proceedings of the ACM SIGGRAPH/EUROGRAPHICS Workshop on Graphics Hardware, HWWS '99, ACM Press, New York, NY, pp. 75-84.*

T. Möller and E. Haines, "Occlusion Culling Algorithms," Features- "Occlusion Culling Algorithms", [Nov. 9, 1999], pp. 1-5, http://www.gamasutra.com/features/19991109/moller_haines_02.htm.*

Panda, P. R., Dutt, N. D., and Nicolau, A. 2000. On-chip vs. off-chip memory: the data partitioning problem in embedded processor-based systems. ACM Trans. Des. Autom. Electron. Syst. 5, 3 (Jul. 2000), 682-704*

Coorg et al, "Real-Time Occlusion Culling for Models with Large Occluders", Proceeding of 1997 ACM Symposium on Interactive 3D graphics, pp. 1-9.*

"B-Radeon's Hyperz", Tom's Hardware Guide: Graphics Guide—ATi's New Radeon-Smart Technology Meets Bru, 1 page, http://www.tomshardware.com/graphic/00q3/000717/radeon256-11.html.*

Matsuzaki et al., "An architecture of on-chip-memory multi-threading processor", Innovative Architecture for Future Generation High-Performance Processors and Systems, Jan. 2001, pp. 100-108.*

Panda et al., "Local memory exploration and optimization in embedded systems", IEEE Transactions on Computer-Aided Design of Integrated Circuits and Systems, vol. 18, Issue 1, Jan. 1999, pp. 3-13.*

Eldridge et al., "Pomegranate: A Fully Scalable Graphics Architecture", Computer Graphics Proceedings, SIGGRAPH 2000, pp. 443-454.*

Cass Everitt and Mark Kilgard, "Practical and Robust Stenciled Shadow Volumes for Hardware-Accelerated Rendering", http://developernvidiacom/attach/5627, Mar. 12, 2002, pp. 1-8.*

Salamone, Salvatore, "Compatible VPN Wares Support Range of Users, Apps", INTERNETWEEK.com, http://www.internetwk.com/news/news0710-5.htm, Jul. 10, 1998, 3 pgs.

"SEGA's Naomi 2 Technical Overview", *Dreamcast Technical Pages*, http://www.segatech.com/arcade/naomi2/, printed from web Apr. 21, 2003, 4 pgs.

* cited by examiner

APPARATUS, SYSTEM, AND METHOD FOR Z-CULLING

FIELD OF THE INVENTION

The present invention is generally related to Z-culling in graphics systems. More particularly, the present invention is directed towards forming a coarse Z-cull surface for a Z-culling process.

BACKGROUND OF THE INVENTION

A graphics system generates data regarding the location of geometrical primitives of objects with respect to other objects in a model space. Thus, initially the rendering process generates data to represent all primitives (e.g., polygons and triangles) of the scene. However, a displayed image has an associated viewpoint (also known as an eyepoint) for a viewer to view the image. Depending upon the viewpoint of a scene, some of the objects in a scene may occlude (block) the view of other objects. These occluded regions are also sometimes described as hidden surfaces, since they are hidden from view in the final displayed scene. Consequently, the final displayed image will not include pixel data for occluded primitives.

An efficient graphics pipeline culls (eliminates) occluded primitives (e.g., polygons and triangles) of geometrical objects as early as possible in a rendering process in order to avoid performing unnecessary computations (e.g., shading) for hidden surfaces that will not appear in the final displayed pixels of the image. A common culling technique is Z-culling. Z is a distance on an axis perpendicular to the display image plane towards the viewpoint, with the Z distance being measured from the object to a plane parallel to the display plane. Z-culling commonly involves performing a depth test (also known as a "Z-test") of the Z value of each sample of a geometrical object with respect to other objects to determine hidden surfaces that may be discarded in regards to further processing. Exemplary Z-culling processes are described in commonly owned U.S. application Ser. Nos. 09/885,665, entitled "Modified Method and Apparatus For Improved Occlusion Culling in Graphics Systems," by Green et al., filed Jun. 19, 2001; 09/121,317, entitled "Method And Apparatus For Occlusion Culling In Graphics Systems," filed Jul. 22, 1998; and 09/585,810 entitled "System, Method, and Article of Manufacture For Z-Value and Stencil Culling Prior To Rendering In A Computer Graphics Pipeline," filed May 31, 2000, the contents of each of which are hereby incorporated by reference.

A conventional Z buffering algorithm is equivalent to searching for the associated Z values for each polygon sample point to find a minimum Z value for each sample point along the Z axis (i.e., a point on one of the polygons that is closest to the viewpoint). Conventionally, a Z-buffer holds a current sample point (x,y) of the smallest Z value so far encountered. During processing of a polygon the intensity of the point is written into a frame buffer depending upon a logical condition between the depth Z, of the current sample point, and the depth so far encountered in the Z buffer (e.g., depending upon whether the depth Z of the current sample point is less than the depth so far encountered in the Z buffer, although other logical conditions are also used in the graphics art).

One drawback of conventional Z-culling is that it occurs later in the rendering process than desired. Additionally, substantial amounts of memory resources must be devoted to Z-culling. This is because Z-culling processes commonly utilize a portion of a frame buffer to create a Z-buffer for defining a Z-cull surface for every sample point in the scene. However, this results in a performance penalty in regards to memory bandwidth and frame buffer interference required to access and utilize Z-buffer data for Z-culling. Consequently, conventional approaches to accelerating Z-culling processes have significant drawbacks in terms of cost and performance.

Therefore, what is desired is an improved Z-culling technique for accelerating Z-culling.

SUMMARY OF THE INVENTION

An apparatus, system, and method is disclosed for generating information for Z-culling at a coarse level of resolution, such as at a tile level. Z information and coverage mask information for rasterized primitives is coalesced on chip to form information for culling tiles.

In one embodiment of a method, Z depth data for graphical primitives is generated on chip at a fine level of resolution at least as small as one pixel in resolution. At least a portion of the Z depth data is coalesced on chip at the fine level of resolution to generate tile information which identifies covered tiles and a corresponding conservative estimate of a Z depth value for each covered tile. The tile information is utilized on chip to generated information for culling tiles.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
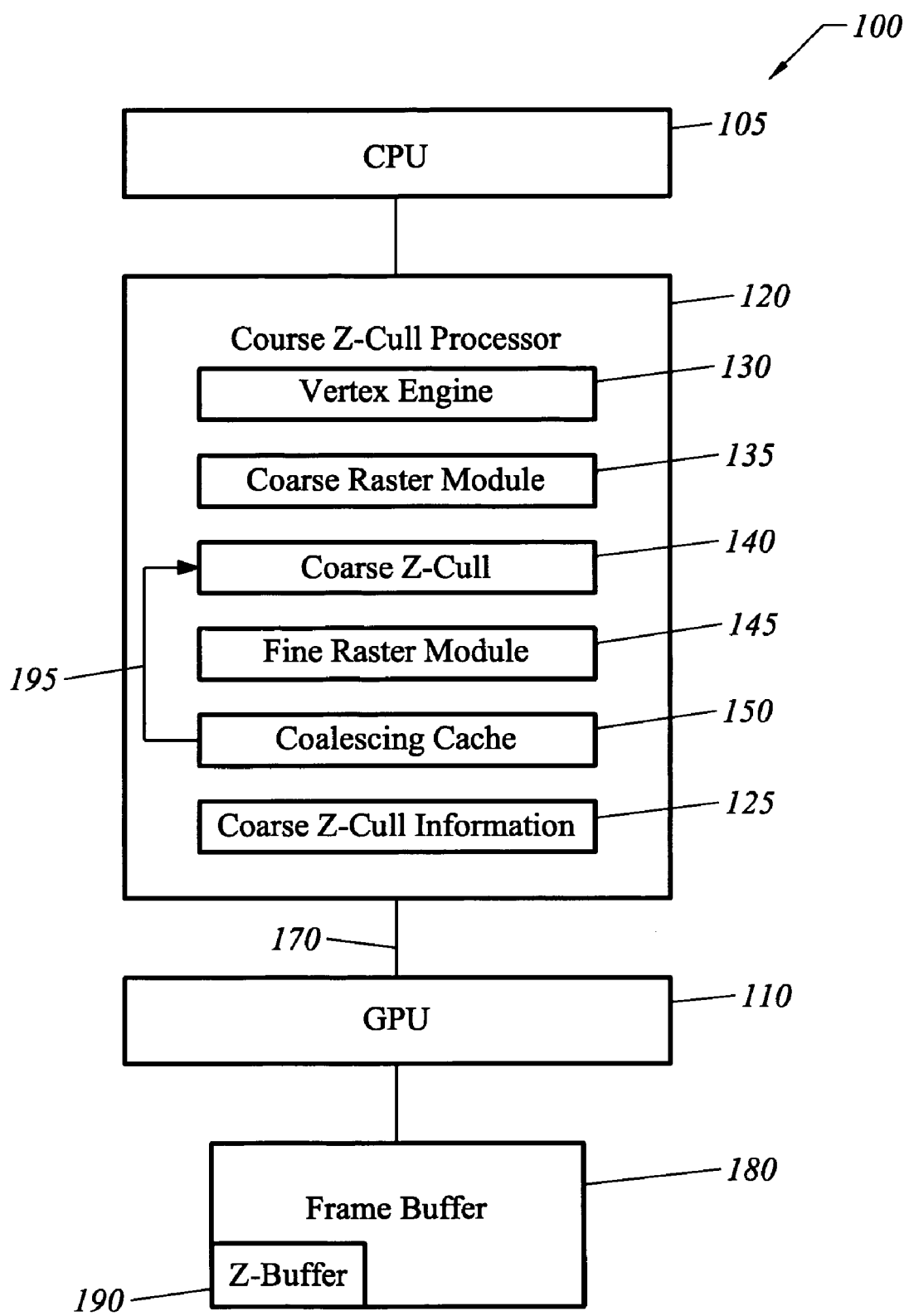
FIG. 1 is a block diagram of a graphics system in accordance with one embodiment of the present invention.

FIG. 1 illustrates a graphics system 100 in accordance with one embodiment of the present invention. A graphics processor unit (GPU) 110 is used to render a scene for an $n^{th}$ frame, where n is an integer frame number, in response to instructions from a CPU 105. A coarse Z-cull processor 120 generates coarse Z-cull information 125.

In one embodiment, coarse Z-cull processor 120 includes a vertex engine 130 to generate vertex information for polygons, a coarse raster operations module 135 to determine sample coverage and coarse Z depth values at a coarse level of spatial resolution corresponding to at least groups of pixels, a coarse Z-cull module 140 for Z-culling coupled an output of coarse raster module 135. A coarse raster operation at a coarse level of resolution is sufficient to generate information for determining a conservative estimate of a nearest Z, Znear, of tiles but may provide insufficient information to determine a coverage mask with a fine enough level of resolution to permit efficient and safe culling of occluded regions. A fine raster module 145 is coupled to the output of coarse Z-cull module 140. Fine raster module 145 generates Z depth information for primitives at a fine level of spatial resolution, such as at a sample resolution at least as small as one pixel. In one embodiment, fine raster module 145 generates a coverage mask at a sample level of resolution.

A coalescing cache 150 is coupled to an output of fine raster module 145. Coalescing cache 150 coalesces Z depth information for neighboring samples and provides Z depth information at a coarse level of resolution for groups of pixels to Z-cull module 140 on feedback path 195. In one embodiment coalescing cache 150 receives Zfar data from fine raster module 145 at the fine level of spatial resolution and generates a bit mask that may be used to determine fully covered regions at a coarse tile level of spatial resolution of Z-cull module 140. As fine raster module 145 generates information for tiles the Zfar values are coalesced into coalescing cache 150. In one embodiment, if there is a hit in the coalescing cache 150 based on an (x,y) location the previously stored Zfar is replaced with a new Zfar that is the farthest of the old Zfar and the new Zfar. If a tile region becomes completely covered, that information is sent to the Z-cull module along with the Zfar value that is the farthest Z value for the pixels of a tile region whose mask bits are set. By coalescing Zfar values and creating a bit mask, tiles can be identified for which Zfar value is guaranteed to have the farthest Zfar value for the entire tile, which is useful for culling operations.

Coarse Z-cull processor 120 may be implemented as an individual processor or integrated into GPU 110. In one embodiment, coarse Z-cull processor 120 is contained within a Northbridge chipset coupling CPU 105 to GPU 110. In a Northbridge chipset embodiment, the Northbridge chipset may also be coupled to system memory (not shown). In a Northbridge implementation coarse Z-cull processor 120 is connected to GPU 110 through a high speed bus 170, such as an AGP/PCI Express interface.

In a coprocessor embodiment, coarse Z-cull processor 120 acts as a coprocessor that works on the n+1 scene frame to generate coarse Z-cull information 125, where n is an integer. Examples of coarse Z-cull information 125 include identifying tiles, or groups of tiles, that may be culled. Additionally, Z-cull information 125 may also include Z information for tiles, or groups of tiles, that will assist GPU 110 to identify an occlusion surface for performing Z-culling of occluded primitives. In one embodiment Z-cull information 125 comprises Zfar information and mask information for some or all screen tiles.

In a coprocessor embodiment, Z-cull processor 120 is working one frame ahead of GPU 110, with GPU 110 processing scene frame n and Z-cull processor 120 working on frame n+1. Thus, GPU 110 works on the nth frame with coarse Z-cull information that will aid it to perform culling of occluded portions of a scene. As a result of the first pass of Z-culling performed by coarse Z-cull processor 120, GPU 110 has a reduced number of computations that it needs to perform for the nth frame, improving the rate at which GPU 110 can process frames.

Z-culling is beneficial if it provides safe opportunities to discard occluded primitives. Consequently, in a coprocessor embodiment, coarse Z-cull information 125 does not have to provide information for culling all possible occluded primitives. Instead, Z-cull information 125 provides a benefit to GPU 110 even if it only provides information that permits GPU 110 to safely discard a significant percentage of occluded primitives at the beginning of the nth frame.

Figure 2:
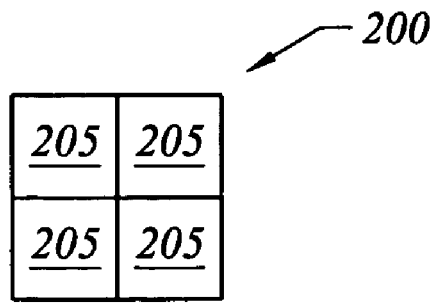
FIG. 2 illustrate a tile in accordance with one embodiment of the present invention.
Figure 3:
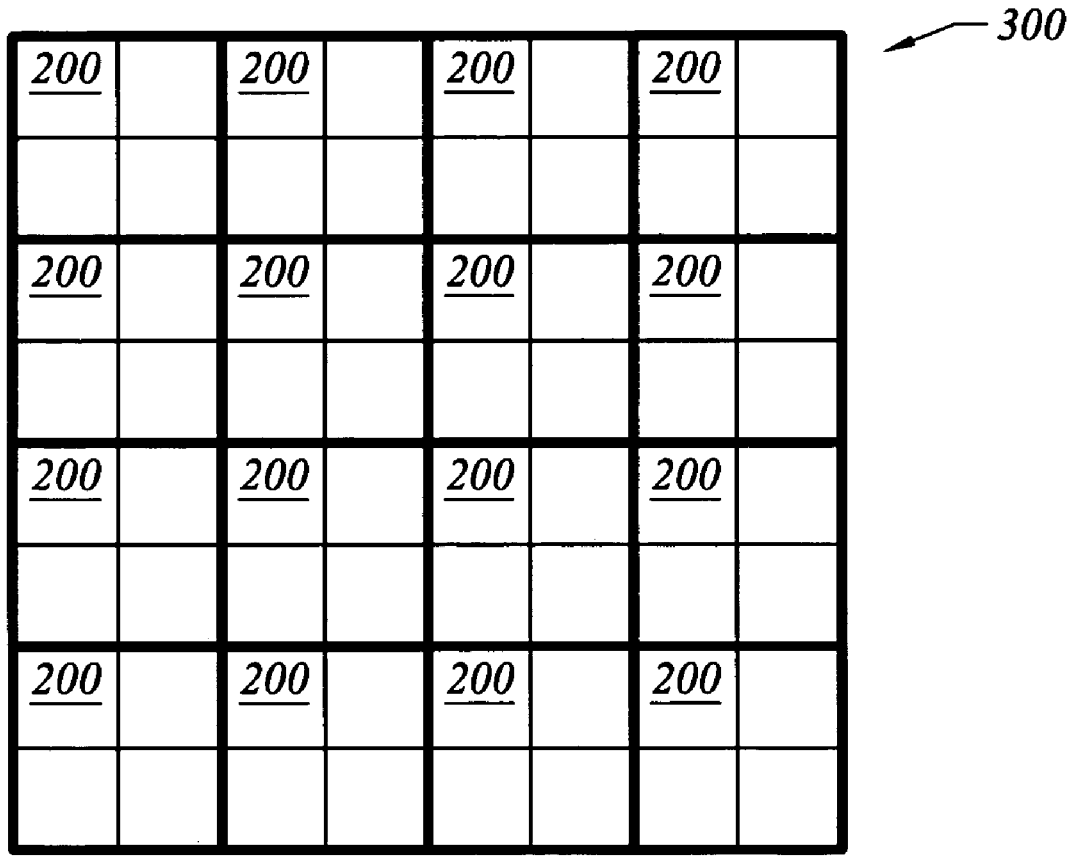
FIG. 3 illustrates a group of tiles in accordance with one embodiment of the present invention.

Coarse Z-cull module 140 performs a Z-cull operation at a coarse level of granularity, such as groups of pixels and tiles. Consequently, in embodiments of the present invention data is arranged to facilitate culling at a coarse level of granularity. Referring to FIG. 2, each new tile 200 that is generated has an (x,y) tile location corresponds to a group of pixels 205 for a surface having at least one primitive. In one embodiment, tile 200 corresponds to a 4×4 array of pixels. Referring to FIG. 3, in one embodiment, information for individual tiles 200 may be further aggregated into a block 300 of tiles 200. In one embodiment, each block 300 corresponds to a 16×16 array of pixels. In turn, an array of blocks (not shown) may be used to represent a display screen. Each newly generated tile 200 corresponds to a potential contribution from at least one primitive of the geometrical model of a scene. A tile is fully covered if the primitive covers all pixels of the tile. In one embodiment, a tile has an (x,y) location. Data associated with a tile 200 includes at least one Z depth value.

Zcull module 140 compares Z values of newly generated tiles with Z values of previously observed tiles to generate information that may be used to cull tiles. One example of a type of Z depth value that may be used by coarse Z-cull module 140 for culling is a Zfar value indicative of a farthest Z value associated with the tile. Data for a new tile 200 that may be used by coarse Z-cull module 140 to cull tiles also include a Znear value indicative of a closest Z value associated with the tile. Z cull module 140 may also use other data to determine whether a status of a tile relevant to culling. For example, data for tile 200 may also include one or more data enable bits to represent a status of the tile, such as a write enable bit.

In one embodiment, coarse Z-cull module 140 maintains Znear and Zfar information for every tile on a screen. In one embodiment, coarse Z-cull module 140 is updated to include a conservative estimate of the previously observed closest Znear values to permit identification of occluder tiles. In one embodiment coarse Z-cull module 140 has a coarse Z-cull coverage mask at a coarse level of granularity, such as 1 bit for a group of pixels (e.g., in one embodiment 1 bit per 4×4 group of pixels).

In one embodiment coalescing cache 150 aggregates Zfar for neighboring samples at a fine level of resolution, such as sample level of resolution. Calculation of Zfar values for Z-culling for safe and efficient culling requires a fine spatial resolution, e.g., a resolution preferably at the sample level, in order to guarantee the farthest Z value for all samples. In one embodiment, fine raster operations module 145 provides coalescing cache 150 with an X location of a tile (e.g., 8 bits), a Y location of a tile (e.g., 8 bits), a pixel mask (e.g., 1 bit per pixel), and a Zfar value for all enabled pixels (e.g., 12 bits per Zfar value), where the Zfar value is the farthest Z value for the pixels whose mask bit is set. Coalescing cache 150 updates Zfar values according to one or more rules described below. Coalescing cache 150 has a coverage mask at a fine level of granularity (e.g., in one embodiment 1 bit per sample). In one embodiment, the coalescing cache coverage mask may be used to limit the transmission of information on feedback path 195 to a coarse level of resolution of relevant information compatible with that of coarse Z-cull module 140, such as transmitting Zfar information for a tile or sub-regions of tiles that have a per sample mask that is completely covered.

Figure 4:
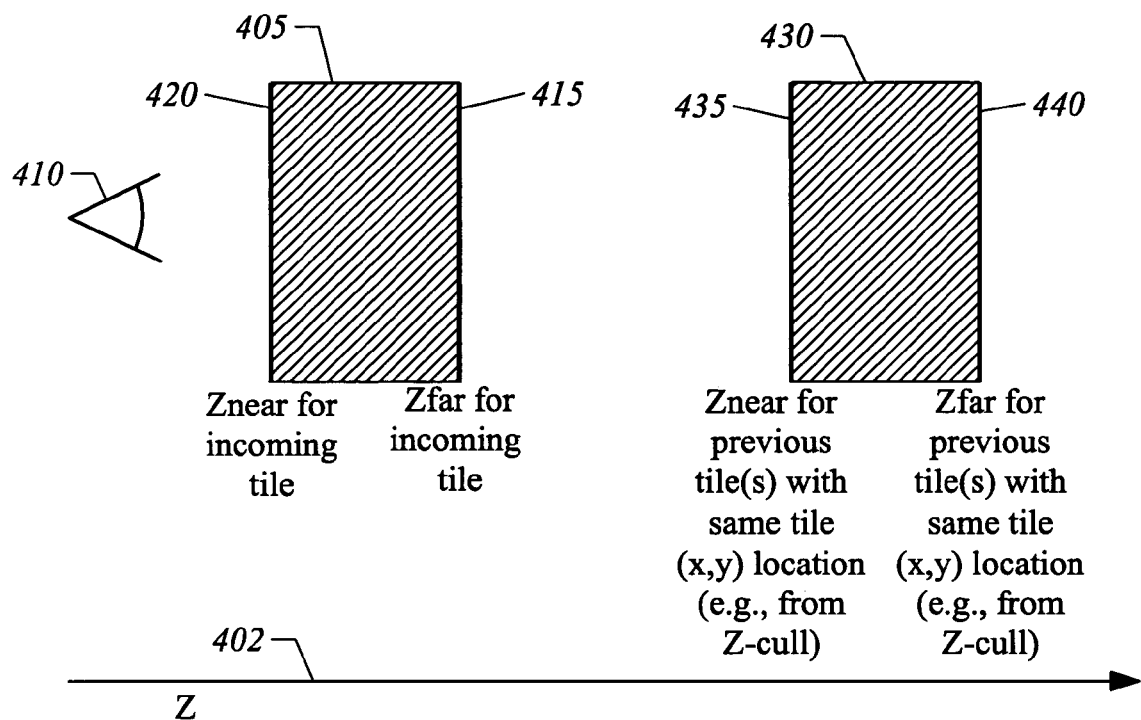
FIG. 4 illustrates a method of identifying tiles that can be culled in accordance with one embodiment of the present invention.

One or more rules may be used by Z cull module 140 to determine whether tiles are occluded or occluders. FIG. 4 illustrates Z values for a new tile with respect to an eyepoint 410, a Z axis, and conservative estimates of Znear and Zfar values for previously observed tiles. The old Znear and old Zfar values may, for example, be associated with values generated by coarse Z-cull module 140 which are generated using rules that eliminate culled primitives. For the purposes of clarity in the following discussion, distances are referred to with respect to distances from eyepoint 410. Referring to FIG. 4, an individual geometrical surface of a tile may be tilted with respect to the Z-axis 402 and thus an individual tile 200 may have a range of Z values on a sample-by-sample basis. However, a conservative estimate of the closest Z (Znear) 420 and farthest Z (Zfar) 415 for a new tile may be calculated by geometrical techniques by, for example, determining the angle of the tile with respect to the Z axis and identifying a clipping plane located at the minimum/maximum Z-depth values across all pixels that compose a tile. Zfar 415 may, for example, correspond to a conservative estimate of maximum Z depth values across all pixels that compose the tile. Znear may, for example, correspond to a conservative estimate of the nearest Z-depth values across all pixels that compose a tile.

A new opaque tile 405 can be identified as an occluder if Zfar 415 is closer to eyepoint 410 than previously observed Znear 435 values for other previous tiles 430 generated for the same (x,y) location. In one embodiment, such a new tile is identified as a tile that may be trivially accepted as a visible tile in a subsequent second pass of rendering if the Zfar of the incoming tile is closer than the Znear of previous tiles. The Znear value in Zcull module 140 may be updated to be the closer of the new Znear value and the old Znear value to reflect that the new tile is the closest yet observed tile for that tile location.

Figure 5:
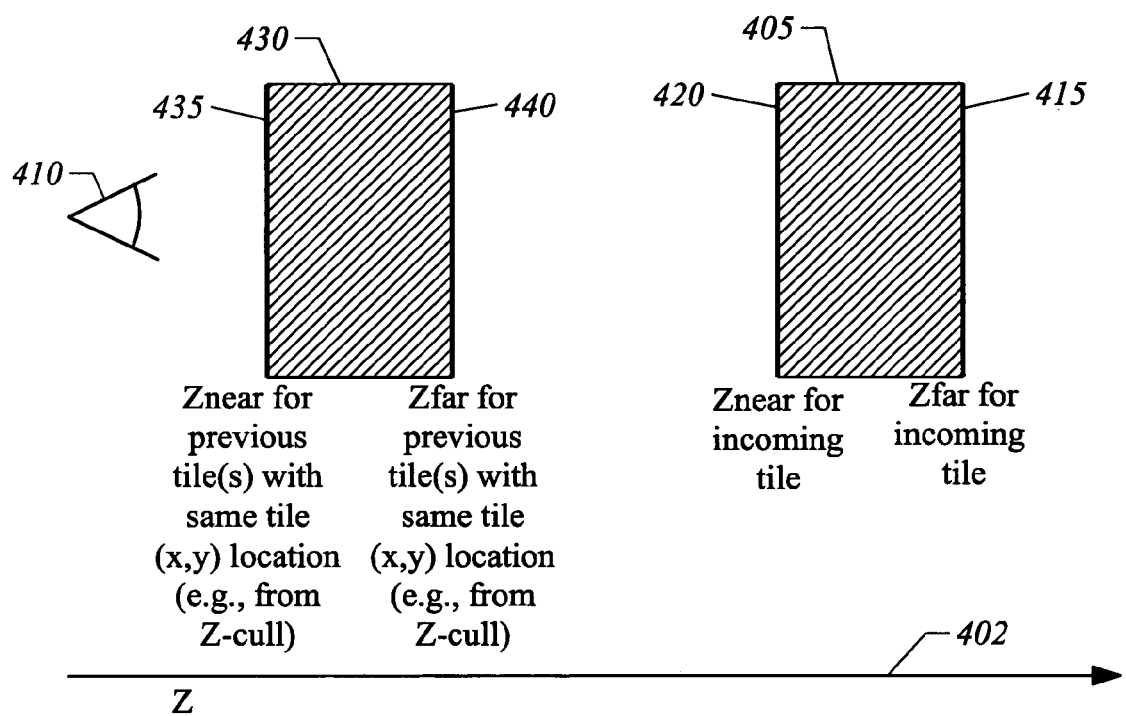
FIG. 5 illustrates a method of identifying tiles that can be culled in accordance with one embodiment of the present invention.

Referring to FIG. 5, a new opaque tile 405 can be identified as an occluded tile if a previously encountered Zfar 440 of opaque tile(s) is closer to eyepoint 410 than the Znear 420 of new tile 405. Additionally, for this case a tile may be identified as being a "trivial rejection" since such a tile is not visible in the final scene. In one embodiment, a trivial rejection test also includes comparing coverage masks. In this embodiment, in addition to determining if a previously encountered Zfar 440 is closer to eyepoint 410 than the Znear of new tile 405, the coverage bits of the previously stored primitives must completely overlap with the coverage bits of the incoming primitive in order to trivially reject a tile.

While the examples in FIGS. 4 and 5 may be understood with respect to comparing Z values of a new tile with those of previously observed tiles, as previously discussed, a tile may also be compared with respect to conservative estimates of Znear and Zfar for an entire block 300 of tiles.

One or more rules may be used for updating Znear and Zfar values used by Z cull module 140. In one embodiment, cache entries are updated to include a conservative estimate of previously observed Zfar values to permit identification of occluded tiles. In one embodiment, one rule that is applied to updating Znear for opaque tiles is that the new Znear is the lesser of an incoming Znear and the previous Znear used by coarse Z-cull module 140 unless there is an indication that another graphics component will alter Z during subsequent processing in which case it becomes the closest value representable.

Figure 6:
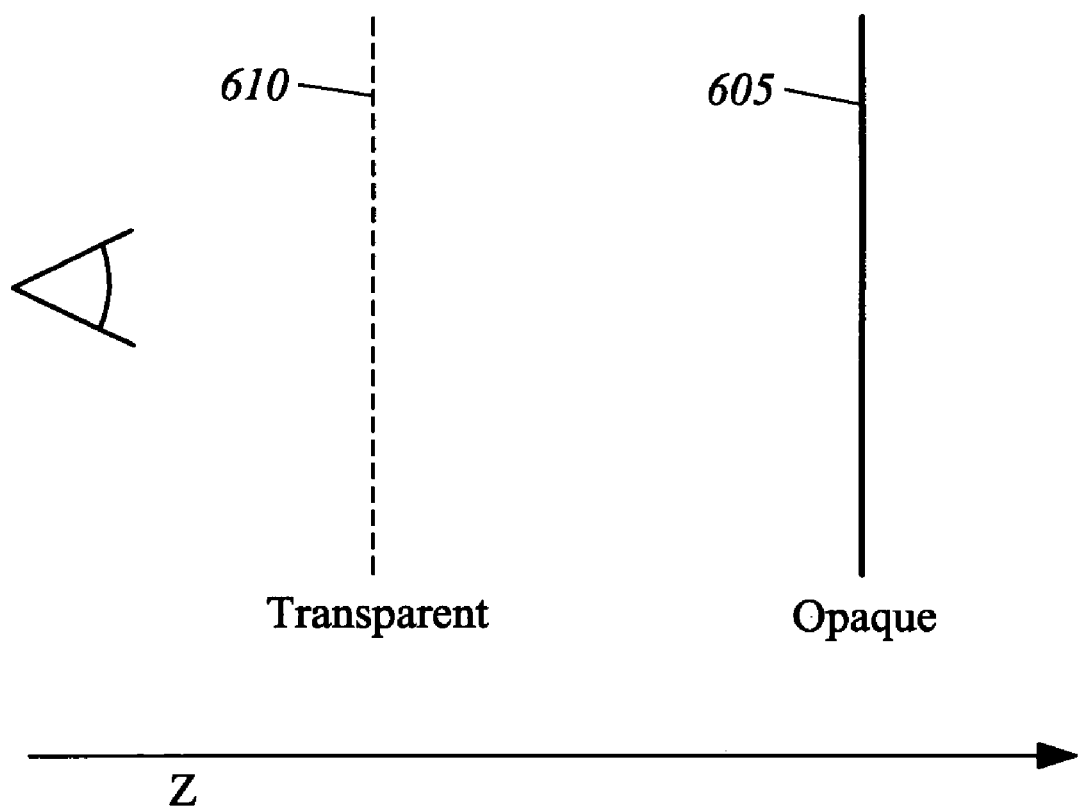
FIG. 6 illustrates a method of identifying tiles that can be culled in accordance with one embodiment of the present invention.

Referring to FIG. 6, in some graphics systems transparent and semi-transparent surfaces are permitted (e.g., for graphical representations of transparent objects). A tile 610 for a transparent object is thus not an occluder for other opaque objects 605 that are directly behind it. In one embodiment, tiles generated for transparent objects do not result in the Zfar values being updated in coalescing cache 150 or coarse Z-cull module 140. However, the Znear is updated in coarse Z-cull module 140 for transparent tiles. Additionally, in one embodiment a tile that is farther away from the eyepoint than previously observed opaque tiles is identified as a tile that can be trivially rejected.

Figure 7:
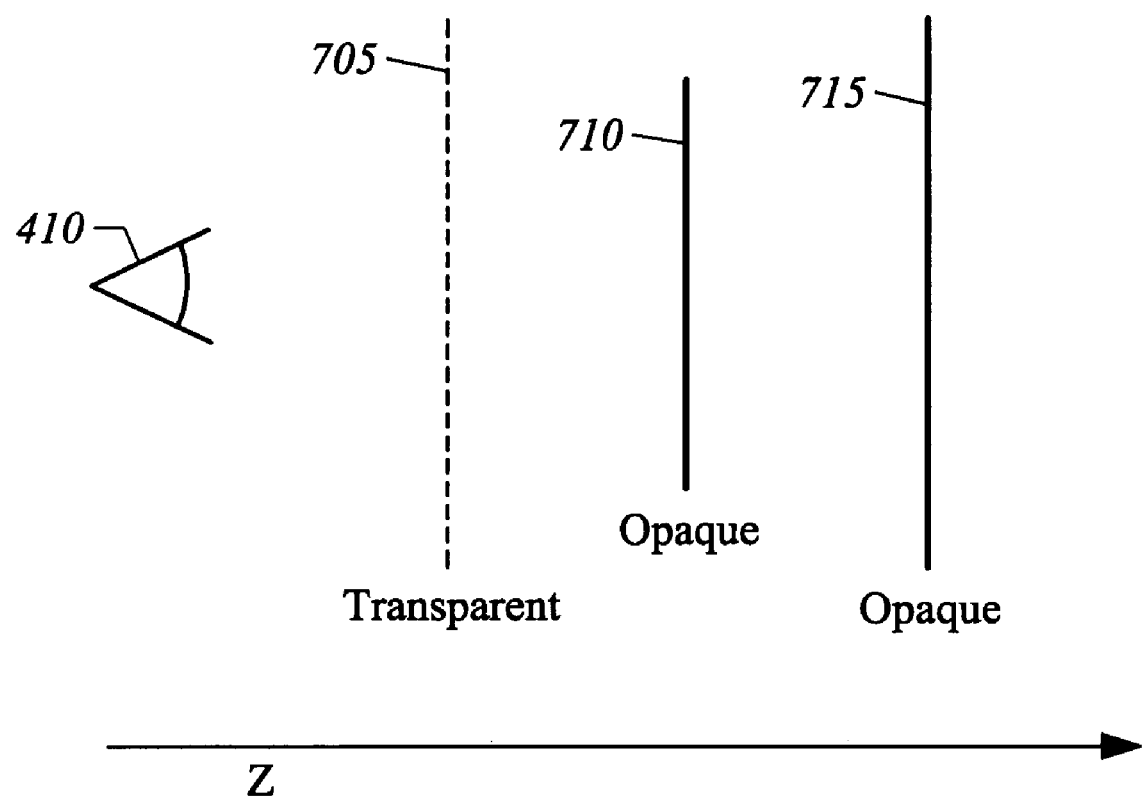
FIG. 7 illustrates a method of identifying tiles that can be culled in accordance with one embodiment of the present invention.

Referring to FIG. 7, a transparent bit may be set to indicate whether an opaque tile, such as opaque tile 710 or 715, is encountered after a transparent tile 705. In one embodiment, when a write enable bit is set, it indicates that a transparent surface 705 has been encountered at that tile location. In one embodiment, only a trivially accepted opaque tile may update Zfar and mask information following a transparent surface 705.

In one embodiment, a threshold Z value (Z threshold) for coarse Z cull module 140 is determined for the entire group of tiles 300 to facilitate representing Z cull information for a group of tiles with respect to a threshold Z value. The Z threshold may correspond to the Zfar value stored for the tile in coarse Z-cull module 140. A mask is associated with the Z threshold. As described below in more detail, the Z threshold is part of one or more rules for determining tiles or portions of tiles that may be culled.

The first instance of a new tile for the group of tiles 300 may be used to set an initial threshold Z value for the entire group of tiles 300. In one embodiment, a new tile having a Zfar closer than the threshold Z moves forward the Z threshold closer to the eyepoint. In some embodiments, the threshold Z for the group of tiles is adjusted if a new tile is within a limit range in order to adjust, as new tile data is received, the Z threshold value. In one embodiment if a new tile has a Z value within a forward limit range of the Z threshold, the Z threshold is pushed up by an incremental distance, the mask associated with the tile is cleared, and one or more bits are set corresponding to the primitive surface that lead to the Z threshold being pushed up. However, if a new tile has a Z value within a backward limit range of the Z threshold, the Z value is pushed down by an incremental distance.

Figure 8:
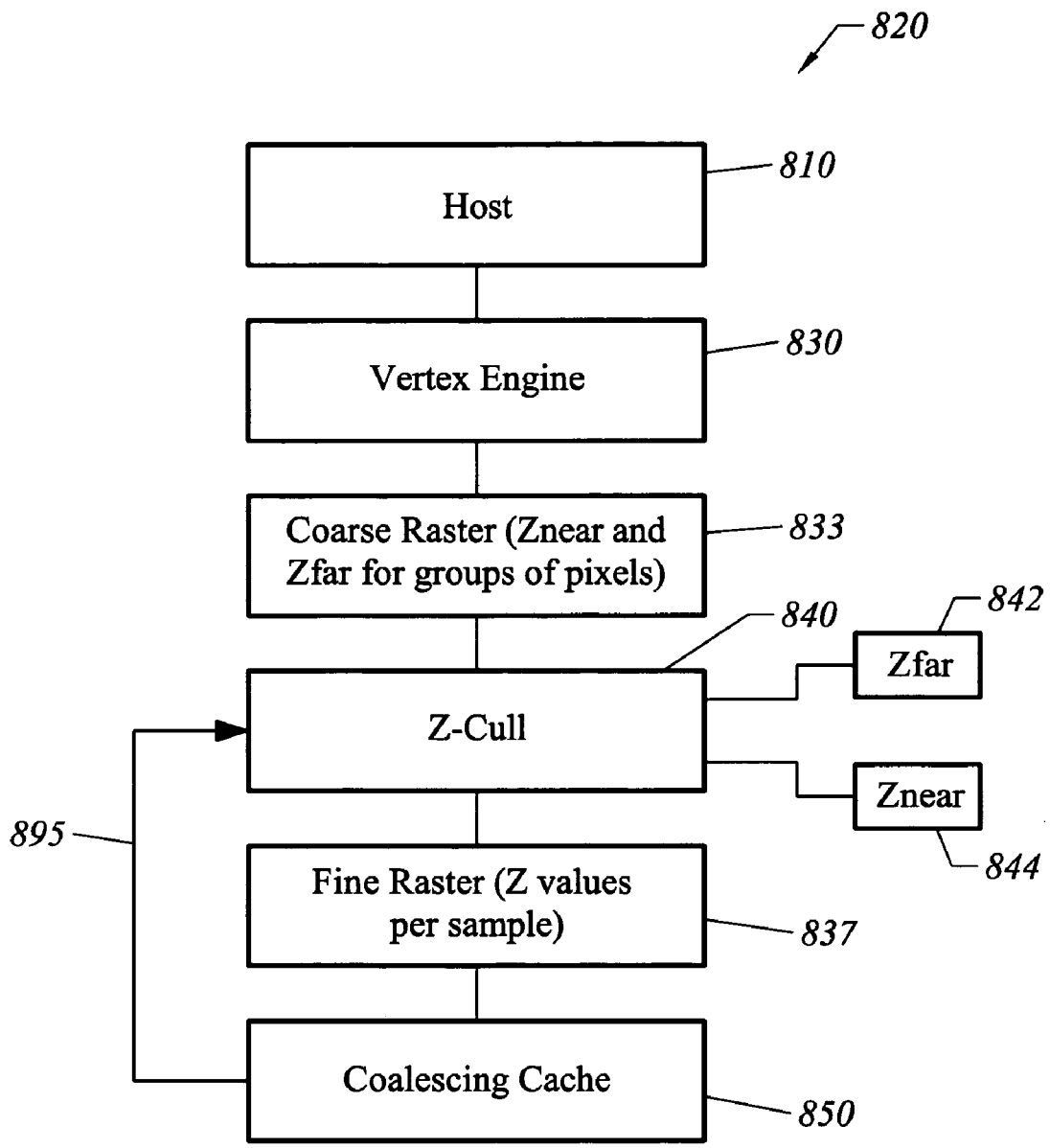
FIG. 8 is a block diagram illustrating a coarse Z-cull processor in accordance with one embodiment of the present invention.

FIG. 8 is a block diagram of one embodiment 820 of coarse Z-cull processor 120. Some conventional graphics components are omitted for clarity. Coarse Z-cull processor 820 includes a host 810 for receiving commands. A vertex engine 830 calculates per vertex attributes for a primitive and may, for example, compute geometrical equations and other data required for rasterization. A coarse raster module 833 computes a pixel coverage value for a primitive at a coarse level of resolution. Coarse raster module 833 may, for example, traverse a primitive on a tile basis and identify pixels that are at least partially covered by a primitive. A coarse Z cull module 840 constructs a surface of the nearest and farthest surfaces of objects being rendered. Coarse Z-cull module 840 generates information to cull out tiles (fully or partially covered) by using previously observed depth values. A Zfar module 842 and Znear module 844 are coupled to coarse Z-cull module 840 to store Zfar and Znear information, respectively, for culling tiles. A fine raster module 837 coupled to the output of Z-cull module 840 computes raster information at a finer level of resolution than for coarse raster module 833.

Coalescing cache 850 is coupled to coarse Z-cull module 840. A feedback path 895 is provided for transmitting information from coalescing cache 850 to coarse Zcull module 840. The Zfar module 842 and Znear module 844 store occluder information for tiles within a group of tiles that is updated with information from coalescing cache 850. In one embodiment, Zfar module 842 and Znear module 844 are implemented as a portion of on-chip random access memory.

In one embodiment, a Zfar value stored for a tile in Zfar module 842 is used as a Z threshold. A corresponding mask is associated with the Z threshold. In one embodiment, each entry in the Zfar module 842, may for example, correspond to a 12 bit Z value and a 16-bit occluder bit mask for identifying Z values and occlusion status of surfaces for 4 pixel×4 pixel tiles within a 4×4 group of tiles (i.e., a 16×16 group of pixels organized into tiles 4 pixels×4 pixels in size). The Z value is a threshold for the 16×16 pixels that may be used to separate occluders from non-occluders. The occluder mask defines which 4×4 pixel tiles 200 within a 16×16 group of pixels 300 footprint have all Z values in front of the Z threshold. In one embodiment if all of the Z values of a 4×4 tile 200 are in front of a Z threshold, an occluder mask bit can be turned on. In one embodiment, whenever the Znear for an incoming primitive (e.g., a triangle) is farther than the Zthreshold and the occluder bit is set, then the incoming primitive is discarded for that tile.

Subsequent tiles adjust the Z threshold. If a new tile arrives which is closer than the current Z threshold, the Z threshold may be adjusted to the new Zfar. In one embodiment, moving the Z threshold up requires clearing the mask. Adjusting the Zthreshold down permits more bits in the mast to be set since the guarantee of the Zthreshold is easier to attain when the Z threshold is moved down.

In one embodiment, if there is a miss in the coarse Z-cull module 140 based on the (x,y) location of the tile, the corresponding entry is replaced with the new tile information. However, if there is a hit based on the (x,y) location of the tile, then a logical OR operation is performed on the bit masks to replace the previously stored Zfar with a new Zfar that is the farthest of (Zfar-old, Zfar-new), e.g., Zthreshold new=farthest of (Zthreshold old, Zfar for incoming tile. In one embodiment, the old occluder mask bits are turned off and the occluder mask bit turned on for the new tile, which may occur, for example, when the new Zfar is within a Z forward limit range.

In one embodiment, if coarse Z cull module 840 determines that the pixels in a rasterized tile are in front of the cached Znear values on which it will land, it turns on a trivial accept signal to indicate that a Z read and Z comparison do not need to be performed.

In one embodiment, the coarse Z cull module 840 remembers both the original and new Znear limits, as well as which raster tiles have arrived. If all 16 raster tiles arrive before the cache entry is displaced, all 16 can be compared against the original Z. In this embodiment, each cache entry has: X, Y (8 upper bits) as a comparison tag, old Znear, new Znear, and update mask. If each tile of the block of tiles has a Zfar value that is closer than the Znear limit, the tile is marked as being trivially accepted. The Znear for an incoming tile may also be compared against the Z threshold, and if the occluder bit is set, tiles or portions of tiles identified for culling. In one embodiment, the entire tile is culled if Z-culling is possible, an occluder bit is set, and the tile has Znear>Z threshold. Additionally, in one embodiment if a tile has Znear>Z threshold an incoming tile is identified as being capable of being at least partially culled.

One benefit of the present invention is that a comparatively small dedicated cache or caches may be used to store occlusion information on-chip. Embodiments of the present invention permit occlusion information to be stored on a tile basis (and in some embodiments, groups of tiles), further reducing memory requirements compared to a storing Z-buffer information 190 on a sample-by-sample basis in an off-chip frame buffer 180. Thus, a substantial compression is achieved which permits a comparatively small on-chip cache to be used to store occlusion information. Additionally, the compression also reduces memory bandwidth required to transmit Z-cull information since only a comparatively low memory bandwidth is required to transfer occlusion information from a coprocessor generating occlusion information for a next frame to a graphics processor working on the current frame. Additionally, utilizing an on-chip cache to store occlusion information eliminates the need to go off chip for occlusion information, which reduces memory bandwidth (e.g., reduced frame buffer memory bandwidth).

While an exemplary policy has been described for coalescing entries in coalescing cache 150 and 850, it will be understood that embodiments of the present invention may include other coalescing policies. As previously described, in some embodiments coalescing cache 150 and 850 compares Z data for a new tile with previously stored Zfar and mask entries. The actions that may be taken with respect to the new tile include: 1) dropping the new tile, i.e., not placing it into the cache or coalescing; 2) coalescing the new incoming tile with existing tiles stored in the cache for the (x,y) screen location; or 3) creating a new entry in the cache for the incoming tile, which may possibly result in displacing another previous entry for the same or other (x,y) location. The algorithm used to select the course of action preferably include criteria for selecting one of the three courses of action such that the algorithm determines optimum occluders for safe and efficient Z-culling. In one embodiment, the decision of which action to take depends upon the Zfar value for the incoming tile relative to cached Zfar values for tile(s) with the same (x,y) location, and values of the coalescing cache mask for incoming tiles, and values of the mask for tile(s) with the same (x,y) location in the cache. Theoretical or empirical studies may be used to determine optimum criteria for selecting each of the three courses of action previously described for a particular graphics system.

While embodiments of the present invention include a coalescing cache 150 and 850, more generally it will be understood that the present invention includes embodiments in which the coalescing function is at least partially distributed to other modules. In one embodiment, coarse Z-cull module 140 may perform at least some coalescing of information returned from coalescing cache 150. For example, coalescing cache 150 may coalesce information into a tile of a first size, X, and the coarse Z-cull module 140 may further coalesce information into a second, larger tile size Y, based on information returned from coalescing cache 150 at resolution X. In this embodiment, coarse Z-cull module 140 may include a separate cache to perform its second level of coalescing. However, it will be understood that while embodiments of the present invention may include multiple stages of coalescing performed within different modules that the logical operations will be equivalent to those performed using a single coalescing cache 150.

Figure 9:
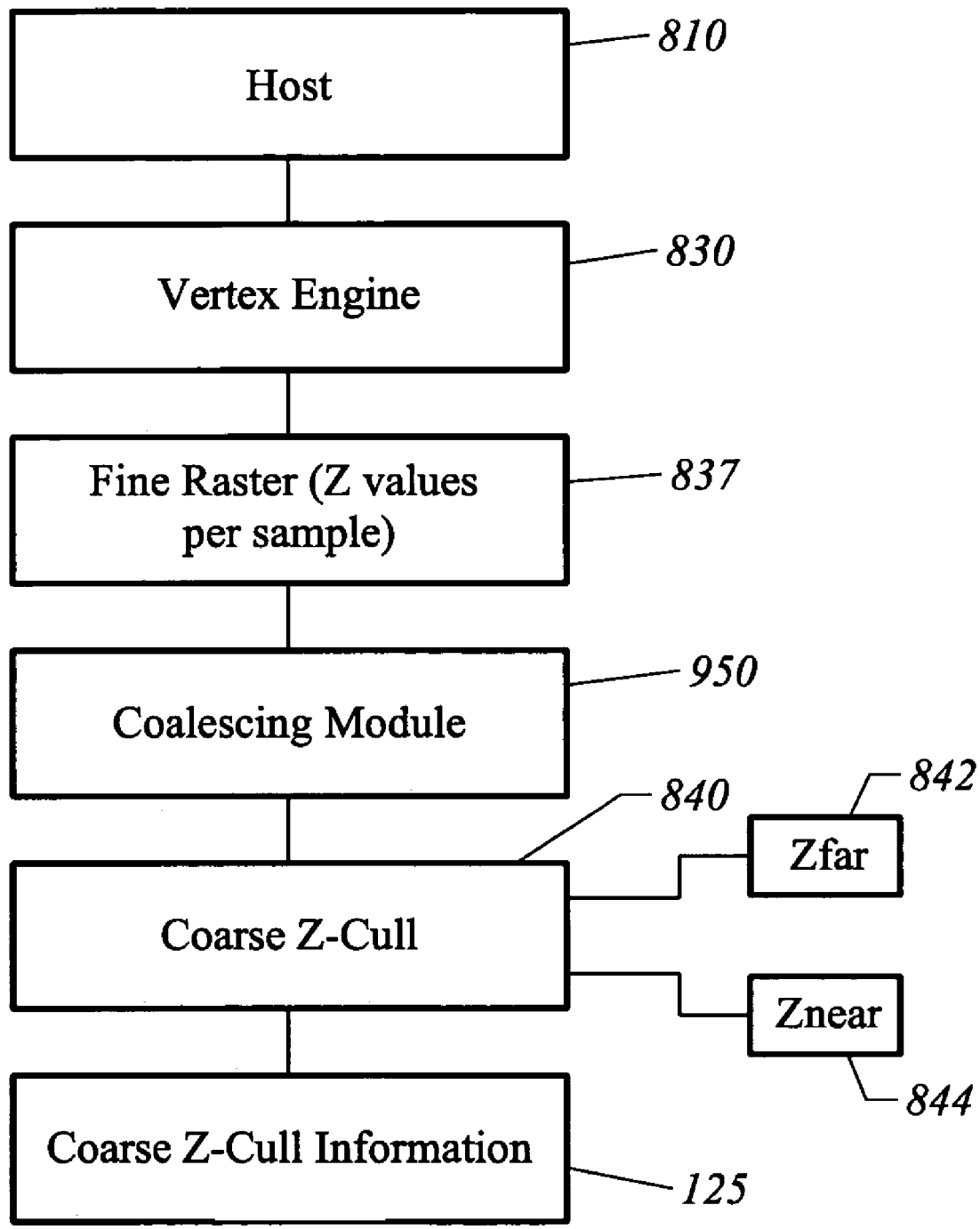
FIG. 9 is a block diagram of an alternate embodiment of a coarse Z-cull processor.

It will also be understood that the components described for performing the function of coarse Z-cull processor are exemplary and that embodiments of the present invention may include other arrangements of components. For example, referring to FIG. 9, in one alternate embodiment, fine raster module 837 is coupled to vertex engine 830. A coalescing module 950 is coupled to the output of fine raster module 837 and performs coalescing on the incoming tiles that are produced by an incoming triangle, i.e., coalescing is performed within a single triangle to produce information about fully covered tiles. Consequently, in some embodiments coalescing module 950 does not require a cache.

Coarse Z-cull module 840 is coupled to the output of coalescing module 950. One benefit of this arrangement is that a coarse raster module is not required.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of forming information on chip for culling tiles of a graphics system, comprising:
    on a graphics processing unit, performing rendering of scenes, including performing a second pass of Z-culling on a frame-by-frame basis;
    on a coprocessor acting one frame ahead of said graphics processing unit to perform a first pass of Z-culling at a coarse level of resolution, including:
        performing a first step of vertex processing to calculate vertex data for rasterization of a current frame being processed by the coprocessor;
        performing a first step of rasterization to rasterize the current frame fame being processed by the coprocessor;
    constructing a surface of nearest and farthest objects being rendered and determining Z depth data for near and far objects;
    determining a Z depth threshold value to perform Z-culling to identify covered tiles to perform the first pass of Z-culling at a coarse level of resolution for the current frame; and
    providing coarse Z-cull information to said graphics processing unit to begin the second pass of Z-culling for the current frame;
    said coprocessor performing vertex processing, rasterization, and Z-culling on a frame-by-frame basis to process frames identical to those processed by said graphics processing unit but with said coprocessor working one frame ahead of said graphics processing unit and at a coarser level of resolution such that said graphics processing unit begins the processing of a new frame with an initial set of culling information generated by said coprocessor for the same frame.

2. The method of claim 1, wherein said graphics processing unit performs a second step of vertex processing, a second step of rasterization, and a second step of Z-culling for the current frame at a time corresponding to one frame after said coprocessor processes the current frame.

3. The method of claim 1 wherein said first pass of Z-culling comprises:
    on said coprocessor, rasterizing primitives at a coarse level of resolution and generating Znear data for tiles, where Znear is a conservative estimate of a nearest Z value of a tile with respect to an eyepoint;
    on said coprocessor, for each incoming primitive, comparing Z depth values of incoming tiles of said primitive with previously observed Znear values for tiles with the same tile location and Zfar values tiles with the same tile location to generate information for determining tiles to be culled;
    on said coprocessor, rasterizing primitives at a fine level of resolution to generate Zfar data for graphical primitives at a fine level of resolution at least as small as one pixel in resolution; and
    on said coprocessor, forming said Zfar values for tiles by coalescing at least a portion of said Zfar data at said fine level of resolution in an on-chip cache memory to generate tile information which identifies fully covered tiles and a corresponding conservative estimate of a Zfar value for each fully covered tile; and
    providing a feedback path to utilize said Zfar values for tiles generated by said coalescing for use in said determining tiles to be culled that is provided to said graphics processing unit to begin said second pass of Z-culling.

4. The method of claim 3, further comprising: identifying tiles that can be accepted as being non-occluded.

5. The method of claim 3, further comprising: identifying tiles that can be rejected as being occluded.

6. The method of claim 3, wherein said Z-culling information comprises a z threshold and a mask for identifying tiles that are occluded.

7. An integrated circuit for forming information for Z-culling information, comprising:
    a coprocessor including:
        a vertex engine to perform vertex processing;
        a coarse-raster module configured to receive data from the vertex engine and rasterize primitives at a coarse level of resolution corresponding to tiles having groups of pixels and generate information sufficient to determine a Znear for tiles corresponding to a nearest Z distance of a tile with respect to an eyepoint;
        a coarse Z-cull module receiving an output of said raster module, the Z-cull module constructing a surface of nearest and farthest objects being rendered and determining Z depth data for near and far objects to generate information for determining tiles that may be culled by comparing Z depth information of incoming tiles with Znear and Zfar values of previously observed tiles having the same tile location, where Zfar is a farthest Z distance with respect to said eyepoint;

a fine raster module coupled to an output of said Z-cull module configured to generate Zfar values for incoming primitives at a fine resolution corresponding to screen regions at least as small as one pixel in size, each Zfar value corresponding to a conservative estimate of a farthest Z value with respect to an eyepoint; and an on-chip cache memory configured to coalesce said Zfar values generated from said fine raster module, coalesce coverage masks across samples, generate Zfar values for samples within tiles, and provide a maximum Zfar value for covered tiles to said Z-cull module;

said coprocessor being operative to generate coarse Z cull information for determining tiles capable of being culled;

said coprocessor performing vertex processing, rasterization, and Z-culling on a frame-by-frame basis to process frames identical to those processed by a graphics processing unit but with said coprocessor working one frame ahead of said graphics processing unit and at a coarser level of resolution such that said graphics processing unit begins the processing of a new frame including performing a second pass of z-culling on a frame-by-frame basis, with an initial set of culling information generated by said coprocessor for the same frame.

8. The integrated circuit of claim 7, wherein a coalescence cache is configured to compare Zfar values of incoming tiles with cached Zfar values and perform updates of said coalescence cache to maintain a conservative estimate of Zfar values of samples.

9. The integrated circuit of claim 7, wherein a coalescence cache is configured to coalesce coverage masks for incoming and stored tiles.

10. The integrated circuit of claim 7, wherein said coprocessor and said graphics processing unit are disposed on a common chip.

11. The integrated circuit of claim 7, wherein said coarse Z cull module is configured to generate a threshold Z value for distinguishing occluders within a group of tiles.

12. The integrated circuit of claim 7, wherein said coarse Z cull module is configured to identify a new tile as an occluder in response to a Zfar of said new tile being closer to an eyepoint than a previous Znear value for an (x,y) location of said new tile.

13. The integrated circuit of claim 7, wherein said coarse Z cull module is configured to identify a new tile as an occluded tile in response to a Znear of said new tile being farther away from an eyepoint that a Zfar value in said cache for said (x,y) location of said new tile.

14. The integrated circuit of claim 7, wherein a coalescence cache includes a coalescing policy for performing for an incoming new tile at least one of dropping said new incoming tile, coalescing said new incoming tile with exiting tiles, or creating a new entry for said incoming tile.

15. The integrated circuit of claim 7, wherein said graphics processor performs a second step of vertex processing, a second step of rasterization, and a second step of Z-culling for the current frame at a time corresponding to one frame after said coprocessor processes the current frame.

* * * * *